2 Sheets—Sheet 1.

L. HOUSTON.
TENONING-MACHINE.

No. 187,138. Patented Feb. 6, 1877.

Witnesses
S. J. Van Stavorn
Jos. B. Connolly

Inventor
Levi Houston
By Connolly Bros
Attorneys

UNITED STATES PATENT OFFICE.

LEVI HOUSTON, OF MONTGOMERY, PENNSYLVANIA.

IMPROVEMENT IN TENONING-MACHINES.

Specification forming part of Letters Patent No. 187,138, dated February 6, 1877; application filed February 6, 1875.

*To all whom it may concern:*

Be it known that I, LEVI HOUSTON, of Montgomery, in the county of Lycoming and State of Pennsylvania, have invented certain new and useful Improvements in Wood-Tenoning Machines; and I do hereby declare the following to be a full, clear, and exact description of the invention, such as will enable others skilled in the art to which it pertains to make and use it, reference being had to the accompanying drawings, which form part of this specification, in which—

Figure 1:
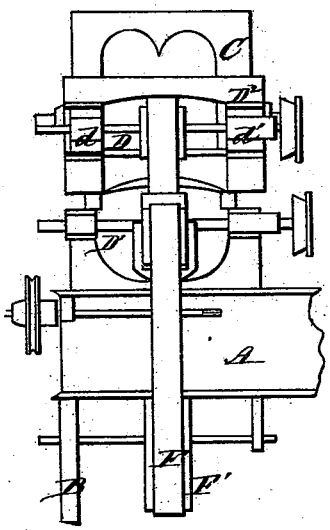
Figure 2:
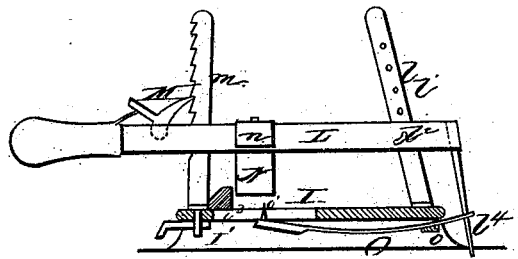
Figure 3:
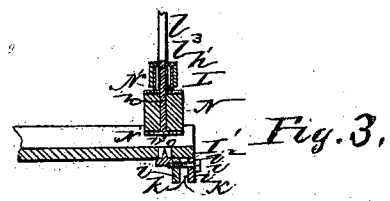
Figure 4:
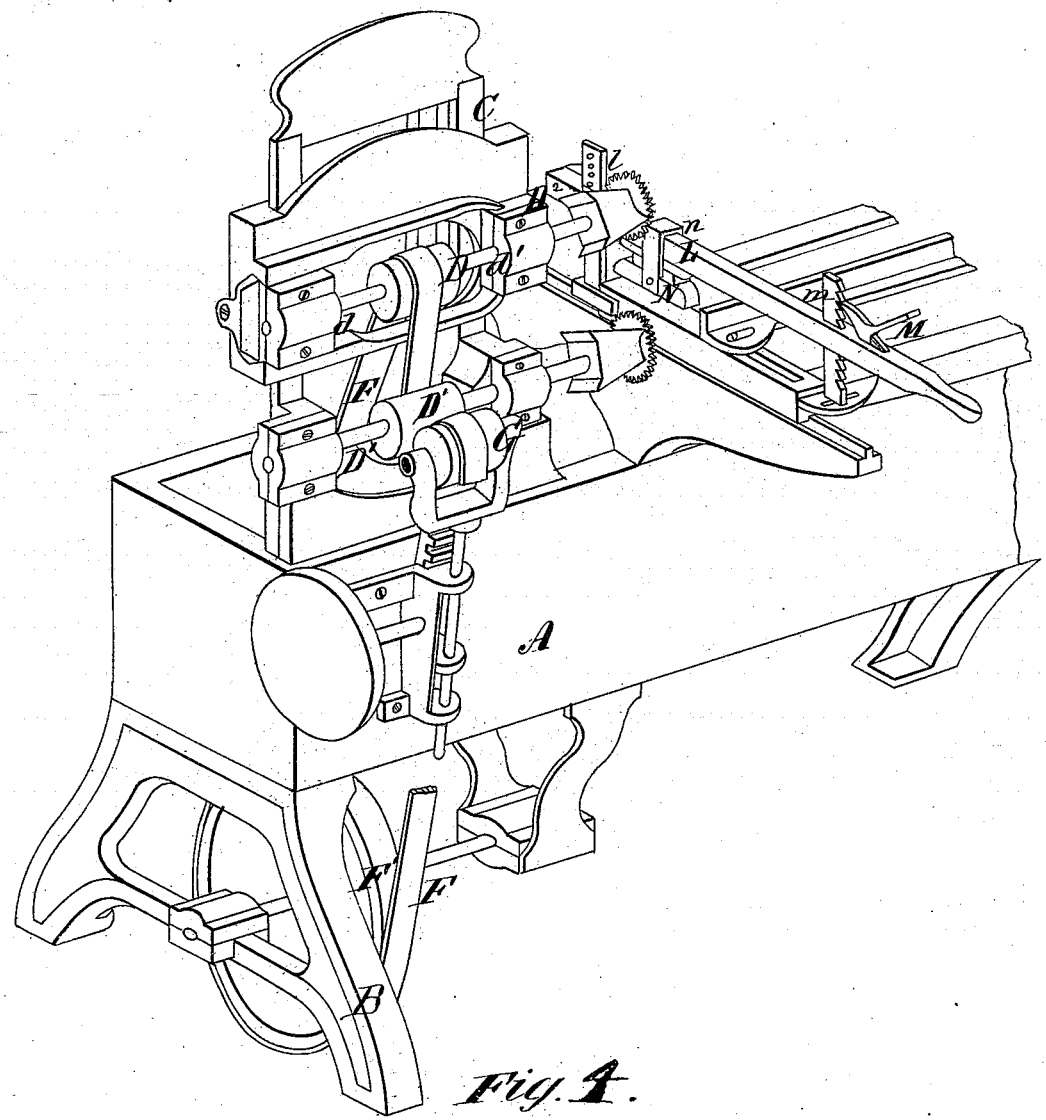

Figure 1 is a front elevation, part broken away. Fig. 2 is a side elevation of the hold-down and marker. Fig. 3 is a transverse section of the hold-down and marker. Fig. 4 is a perspective view.

My invention consists in a tenoning-machine having the following peculiar and novel features: First, a cut-off saw attachment, adjustable with the cutter-heads and run with same belt; second, an adjustable gib on the table, to take up wear or lost motion of the slide and table; third, a round spindle for the tightening-pulley, to yield when one side of the band is longer than the other.

Referring to the accompanying drawing, A is the frame of the machine, mounted on legs B B. C is the head-stock, sliding up and down in ways or bearings on the inside of the frame A. The head-stock C sustains two shafts—namely, the upper and lower cutter-shafts D D$^1$. The lower cutter-shaft is mounted in fixed bearings, and is therefore not independently adjustable, but moves up and down when the head-stock is moved. The upper cutter-shaft, however, is independently adjustable both vertically and longitudinally. $d$ $d'$ are the bearings of this shaft, attached to a head, D$^2$, which may be moved up and down, by a screw or other equivalent means, on the head-stock C, thereby rendering said shaft vertically adjustable, so as to bring the cutters nearer to or farther apart from each other, according to the size of tenon it is wished to make. The bearing $d$—the outside bearing—moves to and fro in guides in the head D$^2$, carrying with it the shaft D, which slides through the bearing $d'$, thereby effecting the longitudinal adjustment of said shaft.

F is the band by which the cutter-shafts and saw-shaft are run, said band receiving motion from the band-wheel F$'$. G represents a tightening-pulley, provided with a round spindle, $g$, fitting in the U-bearing $g'$, which is adjustable vertically by means of a rack and pinion, H. I is the table, moving laterally on slides K K. $k$ $k$ are tongues on said slides, fitting in grooves $i$ $i$ in the table-supports I$'$ I$'$. These supports consist each of two pieces, $i^1$ $i^1$, movable to and from each other by means of screws $i^2$ $i^2$, so as to diminish the width of the grooves $i$ $i$ and take up the wear on the slide and table. L is the hold-down lever, fulcrumed on the standard $l$, which is furnished with adjusting-holes $l^1$, for the reception of a pin, $l^2$. The lever L is furnished with a spring-ratchet, M, which engages automatically with a rack formed on the outside edge of the standard $m$, which passes through a slot in said lever. N is a spring centrally attached to the lever L, and movable to and fro thereon longitudinally, the rod $n$, which passes through said spring, moving in the elongated slot $l^3$ in said lever. N$'$ N$'$ are washers secured to the top and bottom of the spring N to protect it, and $n'$ is a U-bracket on the rod $n$, embracing the sides of the lever L, and serving to steady the hold-down spring. O is a flat spring, moving to and fro in a bearing, $o$, secured to the under side of the table, and holding a pencil or other marker, $o'$, which moves through a slot, $i^3$, in said table. $l^4$ is an arm rigidly secured to the end of the lever L, and passing through an opening in the end of the spring O, so that as said lever is raised and lowered the pencil will be moved to and fro, marking the stuff with transverse lines.

The operation of the machine is simple and obvious. The stuff, laid upon the table and held down and marked by the lever L and pencil, respectively, is duly tenoned by the cutters, which are adjustable in the manner already described.

I claim—

1. In combination with the table I, the longitudinal parallel flanges or supports $i^1$ $i^1$, connected by means of the horizontal screw, $i^2$, the inner flange being adjustable to regulate the width of the groove or channel $i$ between the two.

2. The tightening-pulley G, having a round spindle, swiveled so as to yield when one side of the band is longer than the other, as set forth.

3. In combination with a hold-down lever, L, a marker, O, operated thereby, substantially as shown and described.

In testimony that I claim the foregoing I have hereunto set my hand this 1st day of December, 1874.

LEVI HOUSTON.

Witnesses:
 ANTIS SECHLER,
 G. H. KECK.